US010479680B2

(12) United States Patent
Galloway (10) Patent No.: US 10,479,680 B2
(45) Date of Patent: Nov. 19, 2019

(54) ELECTRICALLY HEATED STEAM REFORMING REACTOR

(71) Applicant: Intellergy, Inc., Berkeley, CA (US)

(72) Inventor: Terry R. Galloway, Berkeley, CA (US)

(73) Assignee: Raven SR, LLC, Pinedale, WY (US)

( * ) Notice: Subject to any disclaimer, the term of this patent is extended or adjusted under 35 U.S.C. 154(b) by 0 days.

(21) Appl. No.: 14/995,713

(22) Filed: Jan. 14, 2016

(65) Prior Publication Data

US 2016/0325990 A1 Nov. 10, 2016

Related U.S. Application Data

(60) Provisional application No. 62/103,246, filed on Jan. 14, 2015.

(51) Int. Cl.
*C01B 3/34* (2006.01)

(52) U.S. Cl.
CPC ........ *C01B 3/34* (2013.01); *C01B 2203/0216* (2013.01); *C01B 2203/0222* (2013.01); *C01B 2203/085* (2013.01); *C01B 2203/0883* (2013.01); *C01B 2203/1235* (2013.01)

(58) Field of Classification Search
CPC ... C10J 2200/09; C10J 3/74; C10J 3/26; B01J 2208/00309; B01J 8/0257; B01J 8/0465; B01J 8/0496; B01J 2208/00415; B01J 2208/00389; B01J 2208/00398; B01J 2208/00407; C01B 3/384; C01B 2203/085; C01B 2203/0883
See application file for complete search history.

(56) References Cited

U.S. PATENT DOCUMENTS

| | | | | |
|---|---|---|---|---|
| 4,909,808 A * | 3/1990 | Voecks | ............... | B01J 8/0285 422/198 |
| 5,770,154 A * | 6/1998 | Bigeard | ............... | B01J 8/0285 422/109 |
| 6,083,425 A * | 7/2000 | Clawson | ............... | B01J 8/0278 252/372 |
| 6,238,815 B1 * | 5/2001 | Skala | ............... | B01J 8/048 422/200 |
| 6,299,994 B1 * | 10/2001 | Towler | ............... | B01J 8/0453 423/652 |
| 6,413,479 B1 * | 7/2002 | Kudo | ............... | B01J 8/0465 208/133 |
| 6,620,386 B1 * | 9/2003 | Welch | ............... | B01J 8/0214 422/198 |
| 2003/0044331 A1 * | 3/2003 | DeBellis | ............... | B01J 19/0013 422/198 |
| 2003/0182861 A1 * | 10/2003 | Weimer | ............... | F24S 20/20 48/197 R |

(Continued)

*Primary Examiner* — Imran Akram
(74) *Attorney, Agent, or Firm* — John V. Daniluck; Brian W. Chellgren; Bingham Greenebaum Doll LLP (57) ABSTRACT

A method and design of providing high temperature heat for an endothermic gasifier without combustion includes flowing a stream of a first hydrocarbon gas sequentially through an annular plenum and a cylindrical plenum while heating the gas using electrical resistance immersion heating elements. These heating elements may be heated by three phase electrical power, minimizing the number of electrical leads emerging from the top of the heating elements. This method and design reduces the risk of extremely hot syngas exiting the gasifier damaging downstream fittings.

42 Claims, 11 Drawing Sheets

(56) References Cited

U.S. PATENT DOCUMENTS

| | | | |
|---|---|---|---|
| 2004/0037758 A1* | 2/2004 | Pollica | B01J 8/0449 422/626 |
| 2004/0126288 A1* | 7/2004 | Fuju | B01J 8/0257 422/202 |
| 2004/0144029 A1* | 7/2004 | Miura | B01J 8/0465 48/127.9 |
| 2004/0187386 A1* | 9/2004 | Wangerow | B01J 8/0449 48/198.3 |
| 2006/0199051 A1* | 9/2006 | Bai | H01M 8/04007 429/425 |
| 2007/0157517 A1* | 7/2007 | Tsay | B01D 53/22 48/198.1 |
| 2008/0066438 A1* | 3/2008 | Inagaki | B01J 8/0465 55/522 |
| 2010/0040519 A1* | 2/2010 | Higashino | B01J 8/0257 422/198 |
| 2011/0151341 A1* | 6/2011 | Tatsui | C01B 3/384 429/412 |
| 2011/0158867 A1* | 6/2011 | Son | B01J 8/008 422/627 |
| 2012/0168680 A1* | 7/2012 | Neels | C01B 3/36 252/373 |
| 2012/0301800 A1* | 11/2012 | Carew | A01K 63/045 429/416 |
| 2014/0087276 A1* | 3/2014 | Kita | C01B 3/38 429/410 |
| 2015/0311549 A1* | 10/2015 | Kita | C01B 3/38 429/419 |

* cited by examiner

ELECTRICALLY HEATED STEAM REFORMING REACTOR

CROSS REFERENCE TO RELATED APPLICATION

This application claims the benefit of priority to U.S. Provisional Patent Application Ser. No. 62/103,246, filed Jan. 14, 2015, incorporated herein by reference.

FIELD OF INVENTION

Various embodiments of the present invention pertain to a high temperature gasification reactor, and in some embodiments such a reactor including steam/$CO_2$ reforming, and in still further embodiments without the use of combustion.

BACKGROUND OF INVENTION

One problem with gasification is poor conversion because the temperatures were simply not high enough to destroy the complex organic compounds and avoid soot and dioxin formation, even in situations where there is partial oxidation with oxygen or even air burning some of the feedstock to produce higher temperatures. Further, there may not be enough heat available in the gasification sections where the syngas was burned to provide heat for the endothermic gasifier to achieve the temperatures needed. As a result gasification has suffered from failed applications, poor economics and general criticism throughout the world as a being an "incinerator in disguise."

Various embodiments of the present invention provide improvements in the heating of gasifier sections that are novel and unobvious.

SUMMARY OF THE INVENTION

This invention in some embodiments relates to a chemical reactor design system in which a new method of electrical heating is disclosed to permit the reactor to operate as a high temperature gasification reactor, specifically steam/$CO_2$ reactor reforming, to achieve the very high temperatures needed without the use of combustion or oxygen-blown combustion and achieving near complete conversion to achieve thermodynamic equilibrium composition in the reforming chemistry with a hydrogen rich syngas with little $CO_2$ or $N_2$ diluent.

What has been achieved by some embodiments this invention is a method and design of providing the required high temperature heat for the gasifier without combustion using electrical resistance immersion heating element technology. Earlier reforming reactors were electrically heated by glass-like heating elements that were very fragile. They were even more brittle once they were heated, and could not easily be removed and replaced in the field.

One embodiment includes a gasifier having heating element technology that involves swaging high resistant nichrome wire in a ceramic matrix under pressure within a high-temperature super alloy tube. Further, these elements could be heated by three phase electrical power; thus, minimizing the number of electrical leads emerging from the top of the heating elements.

Some embodiments address the difficulty of designing the steam reforming reactor with the heating elements and the syngas recuperator into one reactor. This is done in some embodiments to keep the extremely high temperature syngas leaving the reactor from melting the downstream metal fittings carrying the reactor product gases to the downstream piping process.

Yet another embodiment of the present invention pertains to the use of turbulence-enhancing features that provide turbulence into the free stream of the main flow in order to better control the convective boundary layer and achieve increased heat transfer.

Yet other embodiments use a novel electrical lead multilayered bus design that permits an efficient and simple and electrical lead arrangement with minimal lead length.

Yet further embodiments of the present invention include monitoring the temperature of individual leads with an IR camera to detect variations in lead temperature, and further including an electrical control system to vary the application of electrical power and manipulate any temperature variations.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

Element Numbering

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 1 | reformer |
| 2 | wires |
| 4 | screw |
| 6 | busbar |
| 8 | thermocouple |
| 10 | vertical immersion element |
| 12 | sanitary union |
| 14 | busbar |
| 15 | reactor |
| 16 | top flange |
| 19 | top |
| 18 | gaskets |
| 20 | ceramic |
| 22 | flow annulus |
| 24 | tension wrap |
| 26 | wire surface |
| 28 | turbulence trips |
| 30 | screen |
| 32 | fiberglass insulation |
| 34 | reactor metal |
| 36 | bottom mounting plate |
| 38 | insulation |
| 40 | mounting screws |
| 42 | mounting holes |
| 50 | concentric tubes |
| 60 | heating elements; annulus |
| 64 | heating elements |
| 66 | busbar |
| 300 | baffle |
| 301 | diverted flow |
| 302 | exit |
| 306 | pipe |
| 308 | flange |
| 309 | feed flow; flow input streams |
| 310 | elbow |
| 311 | flow outlet streams |
| 312 | flange |
| 314 | insulation plates |
| 316 | feed ports |
| 318 | inlet flows; flow input streams |
| 320 | flange pairs |
| 322 | port |
| 324 | flow outlet streams |
| 326 | exit gas |
| 330 | plenum box |
| 399 | reactor reformer |
| 400 | annular tube |
| 401 | heat exchanger |
| 402 | gas |
| 404 | square wrap |
| 406 | square wrap |
| 408 | plate mixer |
| 410 | exterior ceramic blanket |
| 412 | reactor ball |
| 414 | flow |
| 416 | pipe |
| 418 | can |
| 420 | solid body; heat sink |
| 422 | fasteners |
| 423 | fins |

-continued

| | |
|---|---|
| 424 | ceramic |
| 426 | ceramic insulation |
| 428 | base |
| 430 | base plate |
| 432 | gas flow |
| 434 | pipe |
| 436 | tangential entrance |
| 438 | bottom annular plenum region |
| 440 | spiral gaskets |
| 442 | O-ring |
| 444 | flow |
| 446 | annular space |
| 500 | thermocouples |
| 504 | heating elements |
| 510 | annular flow region |
| 514 | entrance tube |
| 518 | transition points; radius elbow; reactor vessel |
| 520 | body |
| 522 | heat exchanger |
| 523 | exchange plenum |
| 524 | bulkhead fitting |
| 526 | piping |
| 530 | port |
| 532 | annular tube |
| 534 | heat blanket |
| 536 | shape |
| 538 | reactor |
| 542 | bolting |
| 544 | rim clamps |
| 546 | lid |
| 548 | thermocouples |
| 550 | reactor top |

DETAILED DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention.

It is understood that any reference to "the invention" is a reference to an embodiment of a family of inventions, with no single embodiment including an apparatus, process, or composition that should be included in all embodiments, unless otherwise explicitly stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests or analyses that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

Various references may be made to one or more methods of manufacturing. It is understood that these are by way of example only, and various embodiments of the invention can be fabricated in a wide variety of ways, such as by casting, centering, welding, electrodischarge machining, milling, as examples. Further, various other embodiment may be fabricated by any of the various additive manufacturing methods, some of which are referred to 3-D printing.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship $F=ma$ is equivalent to the relationship $F/a=m$). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

In FIG. 1 are shown various views of a preferred embodiment that is a 7 ton per day electrically heated steam reformer 1 that has a number of vertical immersion elements 10 and a flow annulus 22 in the center to reverse the flow direction from in to out that achieves mixing and generates turbulence to enhance the heat transfer, so that the reactor vessel preferably remains under 12 ft in height, although other embodiments of the present invention contemplate reactor vessels of any height. At the bottom of the reactor is a plurality of concentric tubes 50 that feed the reactor and remove the hot syngas while the exchanging between the two so that the exit syngas is not too hot for downstream piping.

Figure 1A:
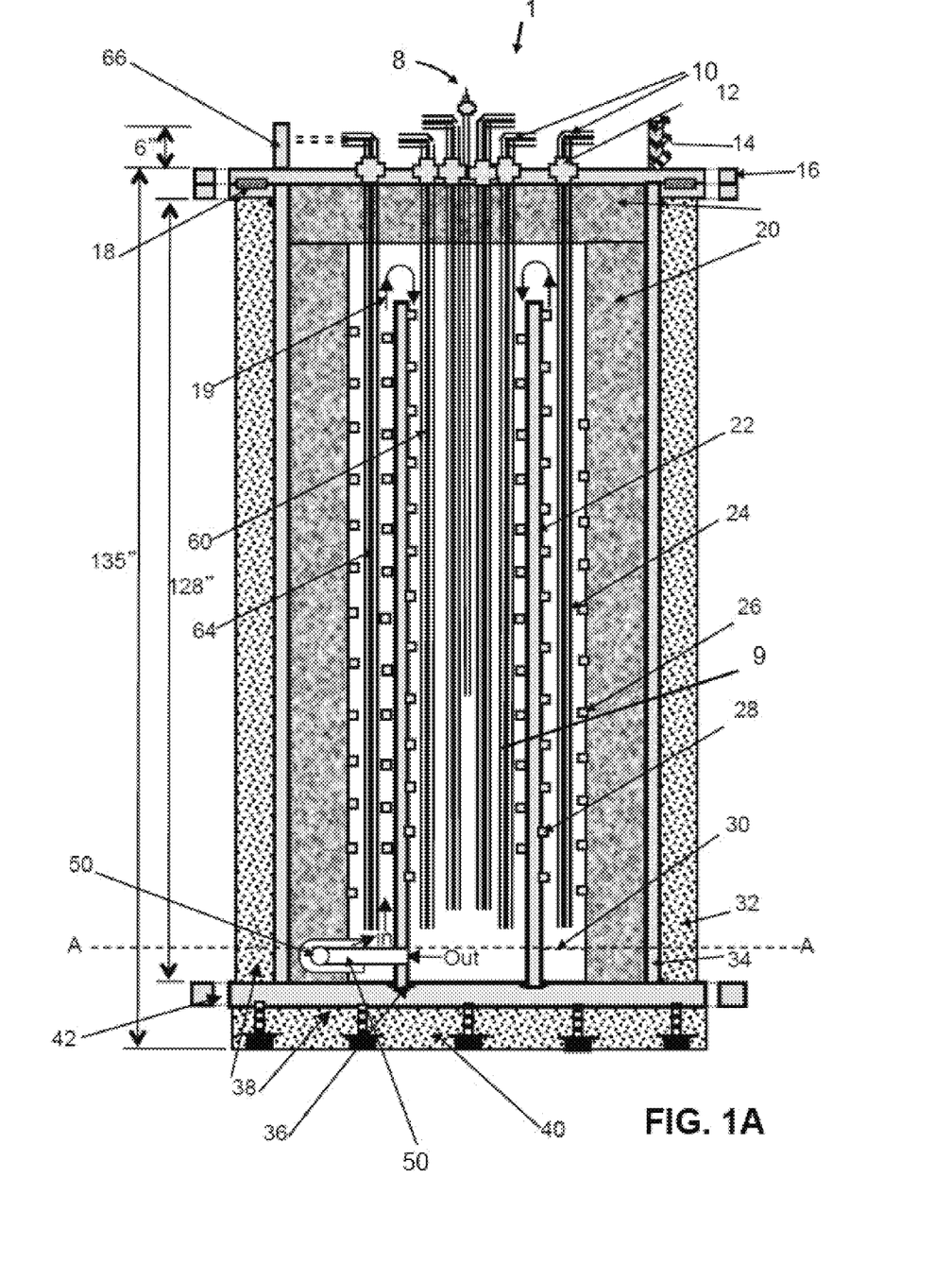
FIG. 1A is a cross sectional representation of an insulated reactor with heating elements inserted downward from the top lid into two flow zones, one with upward flow in the outer annulus and then a flow reversal to downflow in the center of the annulus with flow leaving at the bottom as the reactor exit. Then in both annular flow regions, the flow is enhanced by turbulence-creating features.
Figure 1B:
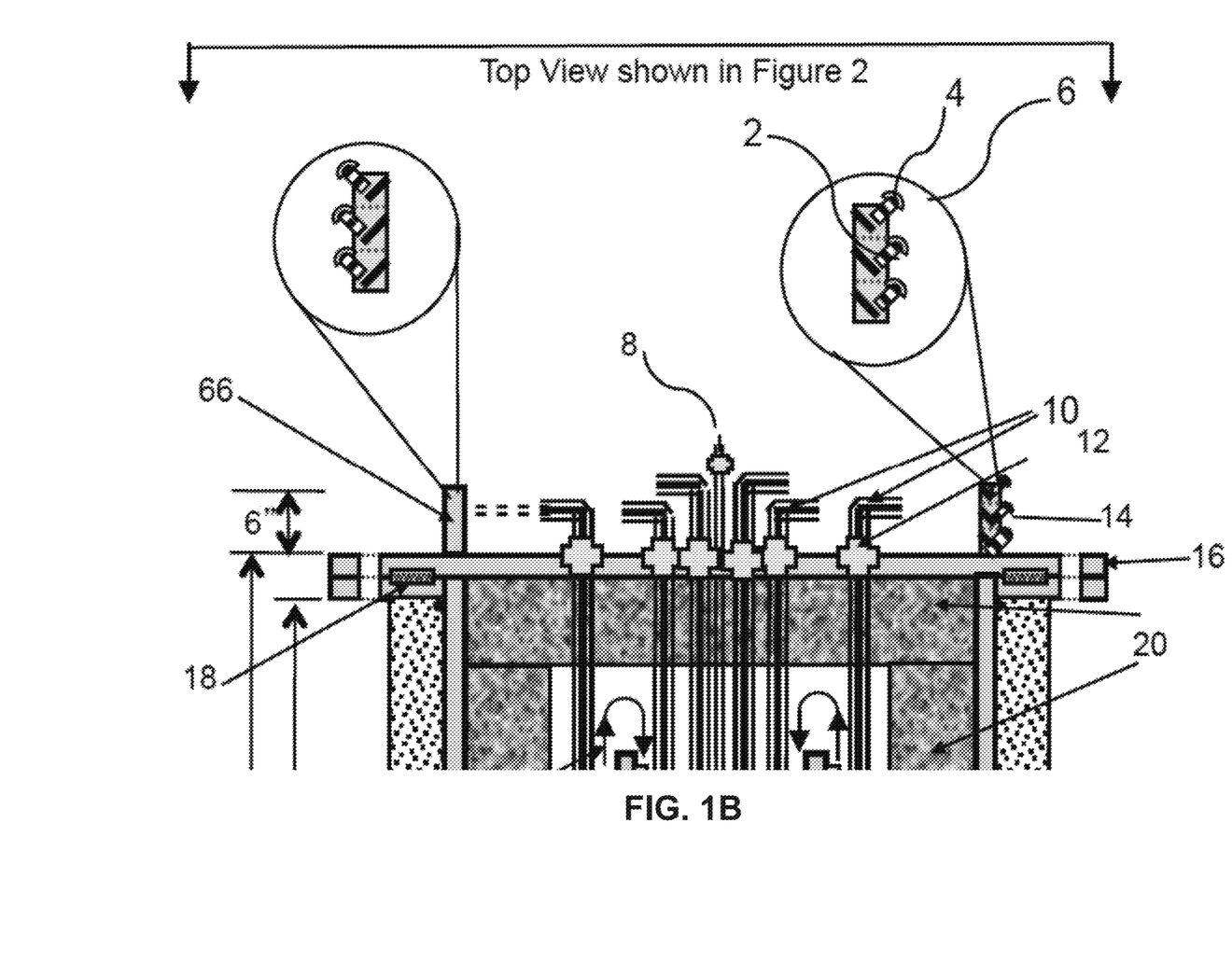
FIG. 1B is an enlargement of the top portion of the apparatus of FIG. 1A.

The heating elements (such as those sold by Chromalox and Watlow, as examples) are mounted in the top flange 16 by means of a sanitary union 12 so they can be easily removed and pulled out even if they have blisters and misshapen diameter after service hours. Around the circumference is a triple stack of busbars 6 into which the wires 2 from the elements can be placed, captured by locking screw 4 and be powered electrically. Down the center is inserted a thermocouple 8 for measuring the temperature of the elements in the center of the reactor.

The reactor is lined on the inside with a foam ceramic 20. The insulation also contains a square wire surface 26 to trip the boundary layer and increase the heat transfer from the heating element. There are also square wire turbulence trips 28 located on both sides of the annulus 22. Note that boundary layer tripping devices 26 and 28 are spaced apart along the direction of flow, which provides turbulent mixing with minimal obstruction to the overall flowpath. Further, it is understood that the boundary layer tripping features can be of any shape and orientation, with square cross sectional wires being just one example. The elements could also use a "tension wrap" 24 to further extend the heat transfer surface for more heat transfer.

As the gases enter into the annulus there is placed a screen 30 that generates turbulence to enhance the heat transfer. Because the reactor is insulated by foam and ceramic 20 on the inside, the reactor metal 34 does not have to involve an exotic alloy. On the outside of the reactor vessel is fiberglass or other suitable insulation 32 to prevent a burning hazard.

Figure 1C:
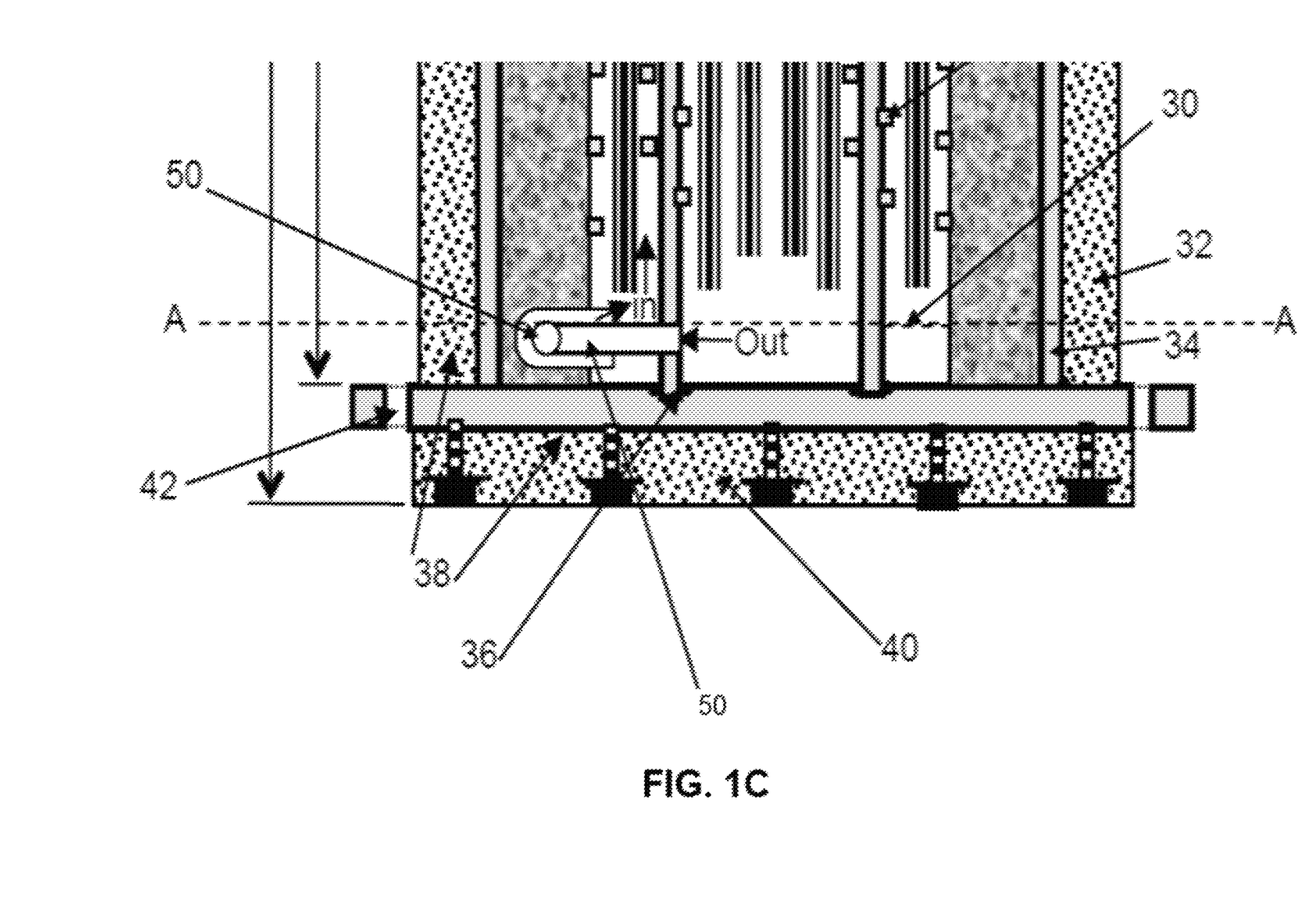
FIG. 1C is an enlargement of a portion of the bottom of the apparatus of FIG. 1A.
Figure 1D:
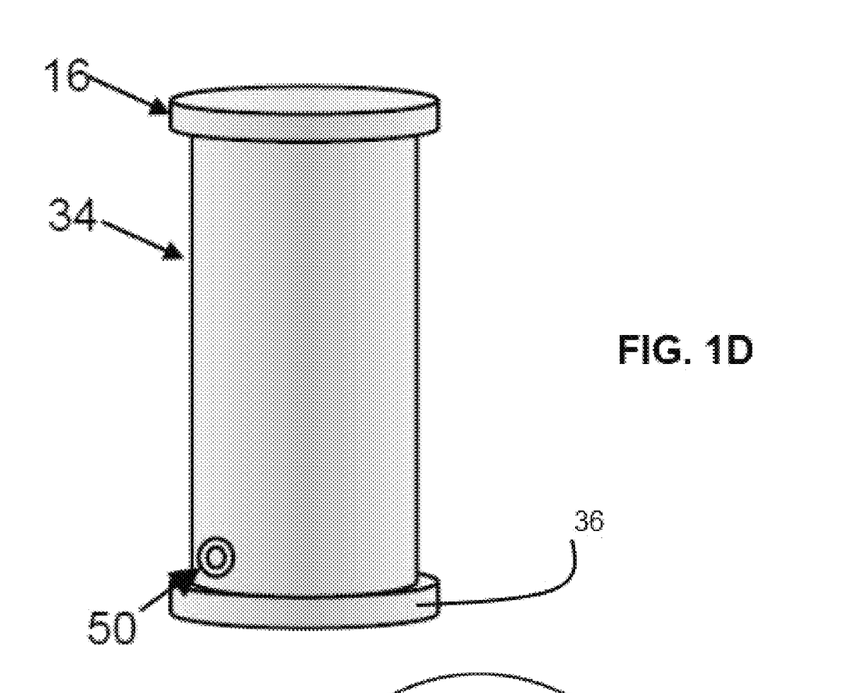
FIG. 1D is an external view of the apparatus of FIG. 1A.
Figure 1E:
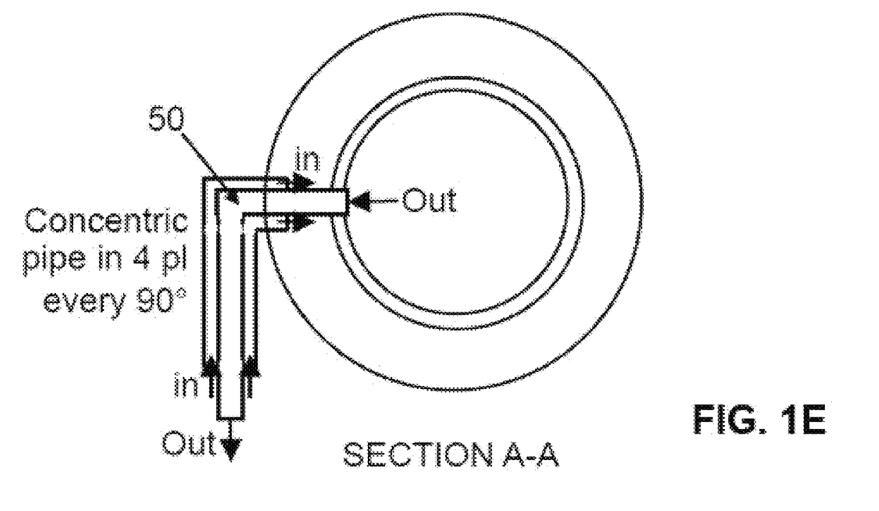
FIG. 1E is a cross sectional view of the apparatus of FIG. 1A as looking down along section A-A of FIG. 1A.

The flange lid on the top of the reactor 15 is sealed by means of gaskets 18 (such as gaskets provided under the name Spirotallic). At the bottom of the reactor is the plate 36 on which the annulus 22 in the reactor vessel is mounted and welded. The bottom plate 36 has insulation foam 38 to keep the temperatures at a reasonable level, and is attached by means of mounting screws 40. This plate also has mounting holes 42 for mounting the reactor to the frame.

The gas fed to the reactor enters by the concentric tubes 50 (see section B-B) which feeds the gas up the outside of the annulus 22, around the top 19, down to the center and exiting it at the center of the concentric tube 50.

Figure 2:
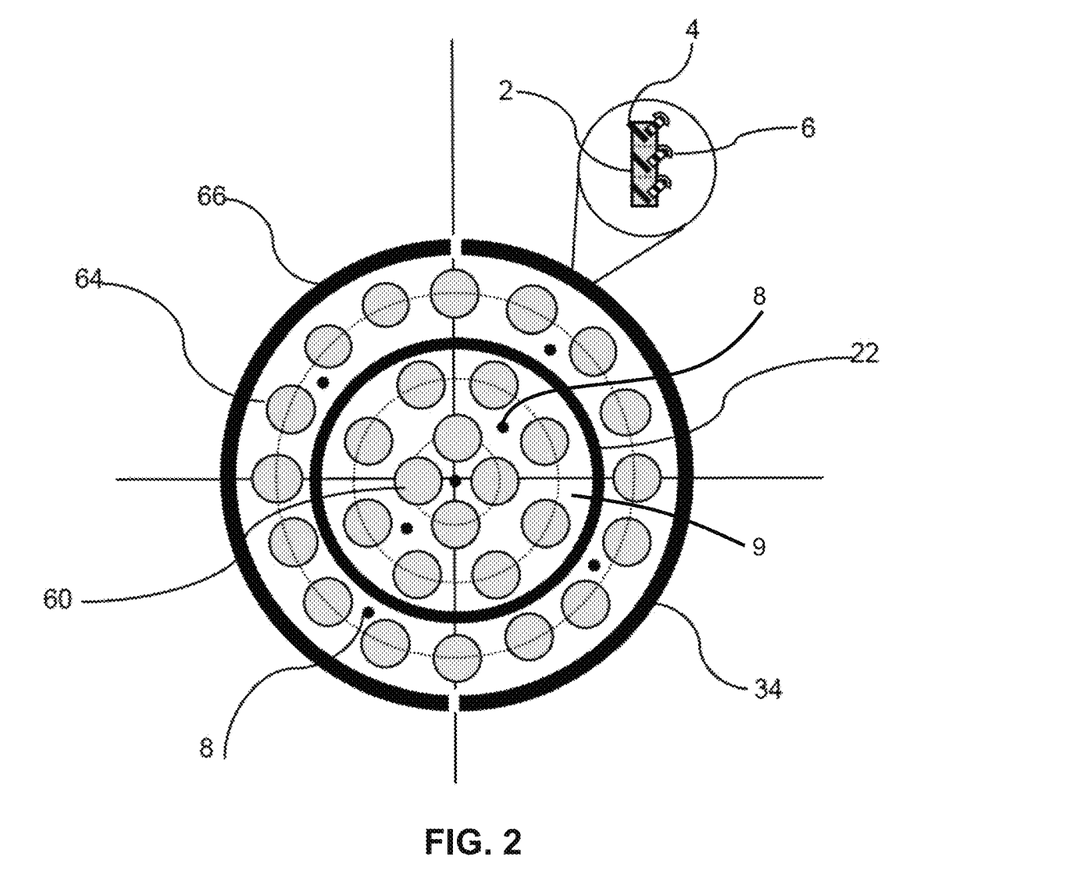
FIG. 2 is a cross sectional representation perpendicular to the centerline of the reactor of FIG. 1A which shows how these heating elements are arranged in the two annular regions.

The arrangement of the heating elements at the top of the reactor serves both the outer annular flow region 22 and the inner annular flow region 9 as is shown in a view from the top in FIG. 2. There is a power busbar 66 just above the reactor top 16 where the power is fed to 12 heating elements 60. Here the inner ring 4 of elements 12 draws 24 Amps and the outer ring of eight elements 12 draws 48 Amps. At the outside ring there is a pair of busbars 14 and 66 for distributing the power to the 16 heating elements 64, with each of the busbars handling 48 amps each. The element power is about 5 kW 480 vac WYE with a magnesium oxide internal ceramic. The common mode voltage to ground is 277 vac in this arrangement and the heat flux is 18 W per square inch for a heated length of 88 inches. The total power for all 28 elements is 140 kW. Throughout the cross-section there are seven thermocouples 8 placed down near the heating elements to get a view of the temperature distribution. Their placement is shown as the black dots in FIG. 2.

Figure 3A:
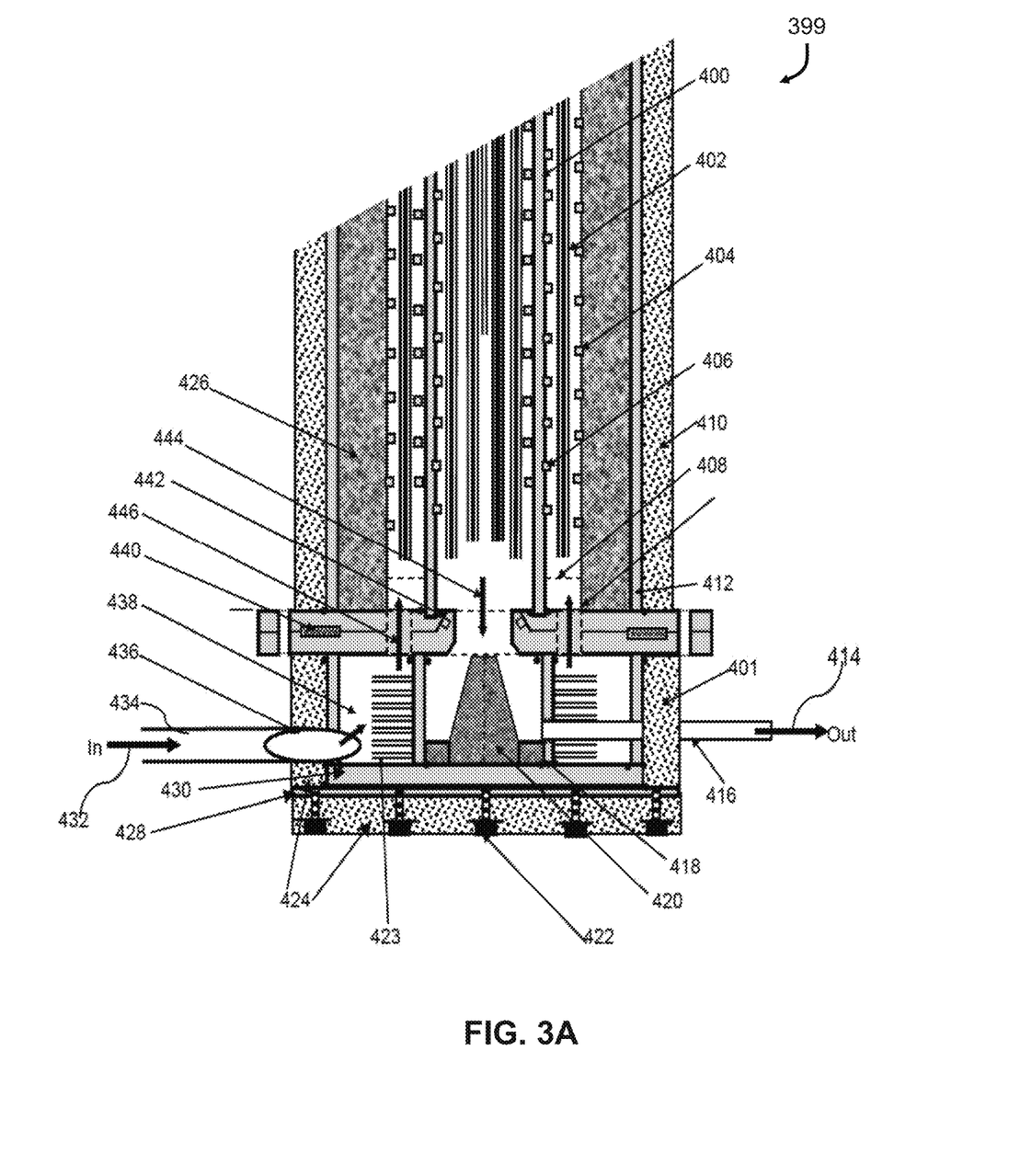
FIG. 3A shows another embodiment in which a high temperature radiation object is used to radiate exit heat on to a fin cylindrical heat exchanger around the outside.
Figure 3B:
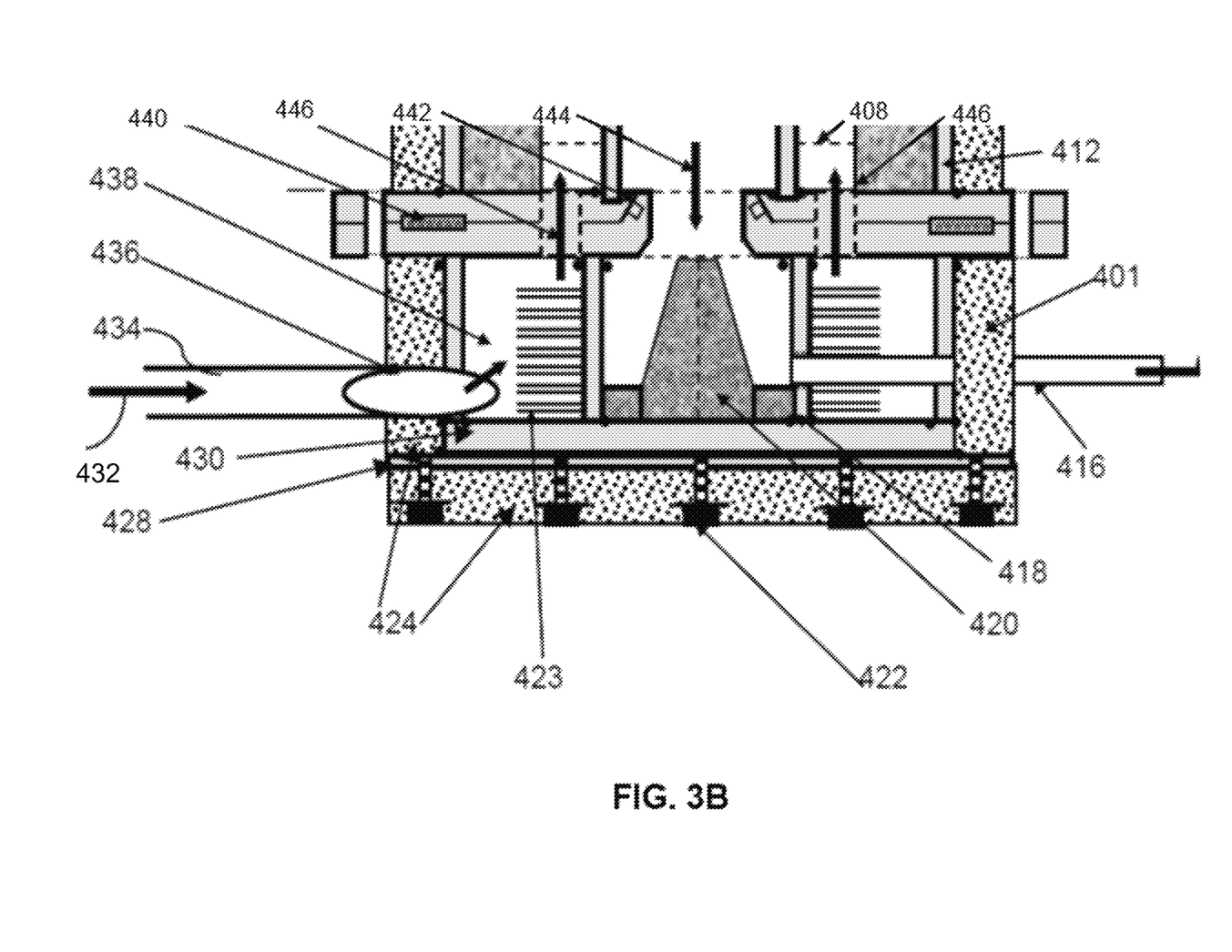
FIG. 3B is an enlargement of the bottom portion of the apparatus of FIG. 3A.

FIG. 3 show a reactor reformer 399 according to yet another embodiment of the present invention. Device 399 includes a heat exchanger 401 at the bottom of the reactor using a reradiating solid body 420. The gas flow 432 enters the bottom of this reactor through pipe 434 that includes a tangential entry 436 which creates the swirl flow in the plenum region 438 improving the heat transfer on the fins 423. This inlet flow is preheated by the heat transfer from the fins 423 that warms the flow entering the annular space 446 of the reactor 412. Electrical heating elements 402 further heat the gas as enhanced by perforated plate mixer 408 as well as the turbulence created by the turbulence-generating features and boundary layer tripping devices 406 on both sides of the annular tube 400. Gas turbulence is created by square wraps 404 and 406.

The flow in the annulus on the outside of the annular tube 400 flows over the top of this annular tube and down the center as flow 444 flowing over the reradiating body 420 and its base 428. Heated body 420 at operating conditions is a glowing yellow-orange hot surface radiating outward onto the surface of the fins 423. This radiating body 420 sits in the reactor exit flow entering the cylindrical can 418. Heat from flowpath 444 is conducted and convected into radiating body 420, which radiates and conducts heat onto fins 423. Thus, these reactor exit gases, having been cooled by the reradiating body and the fins 423, leaves this bottom can through pipe 416 as a cooled flow 414. This plenum chamber 438 is bolted to the reactor 412 that has internal foam ceramic insulation 426 as well as exterior ceramic blanket 410 on top of the reactor wall 412 to avoid skin burning and is sealed with the spiral gaskets for 440 and a small Indium O-ring 442. This bottom plenum is insulated by ceramic 424 on the sides and the bottom which is held on by screws 422 into this plate 428 which is welded to the bottom base-plate 430. The reradiating body 420 is preferably composed of four sections that can be individually removed through the port above so they can be cleaned and replaced.

Figure 4A:
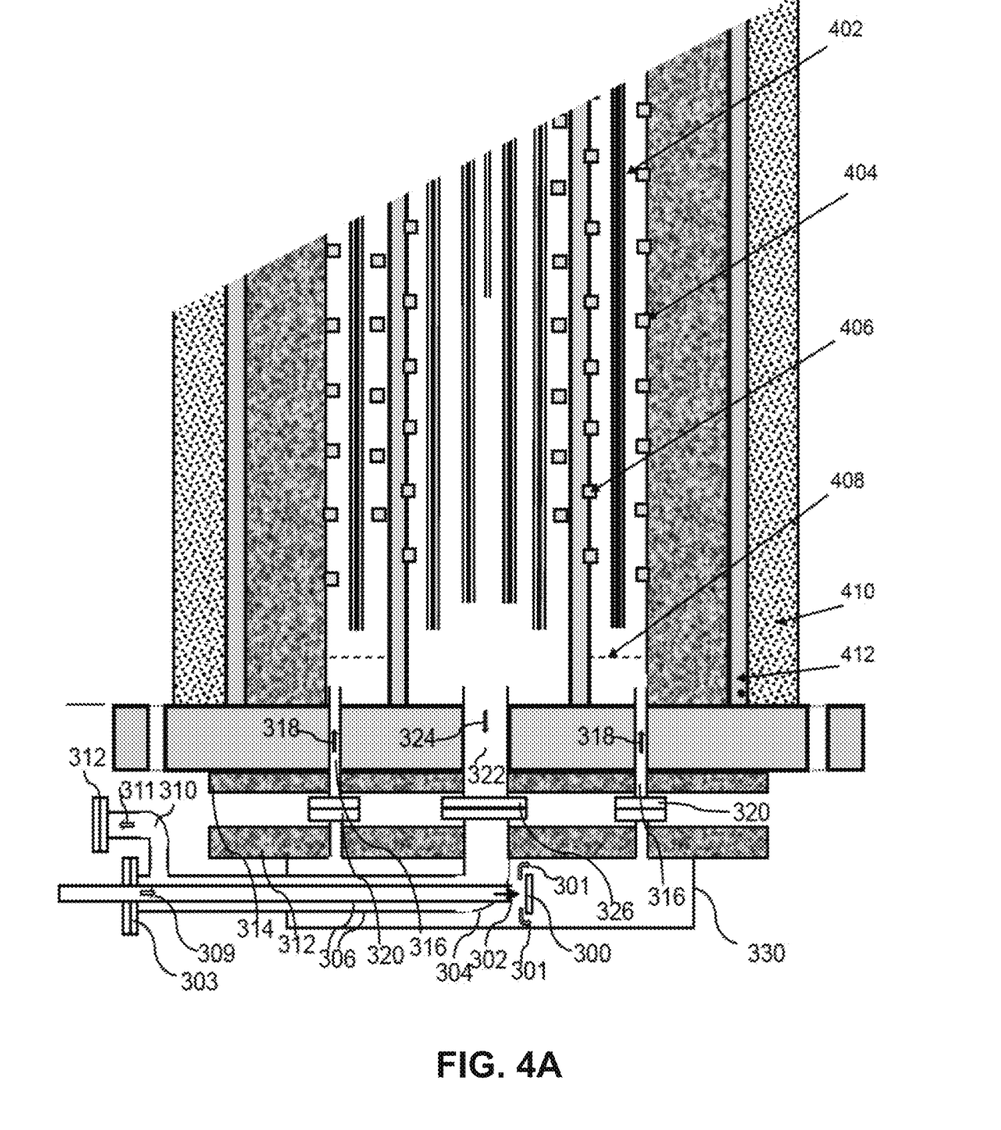
FIG. 4A shows a manifold arrangement according to another embodiment of the present invention where the feed gases are provided into the outer annulus and the hot exit gas leaving the bottom of the reactor in the center. This manifold design preferably provides a counterflow cylindrical tube heat exchanger as a recuperator.
Figure 4B:
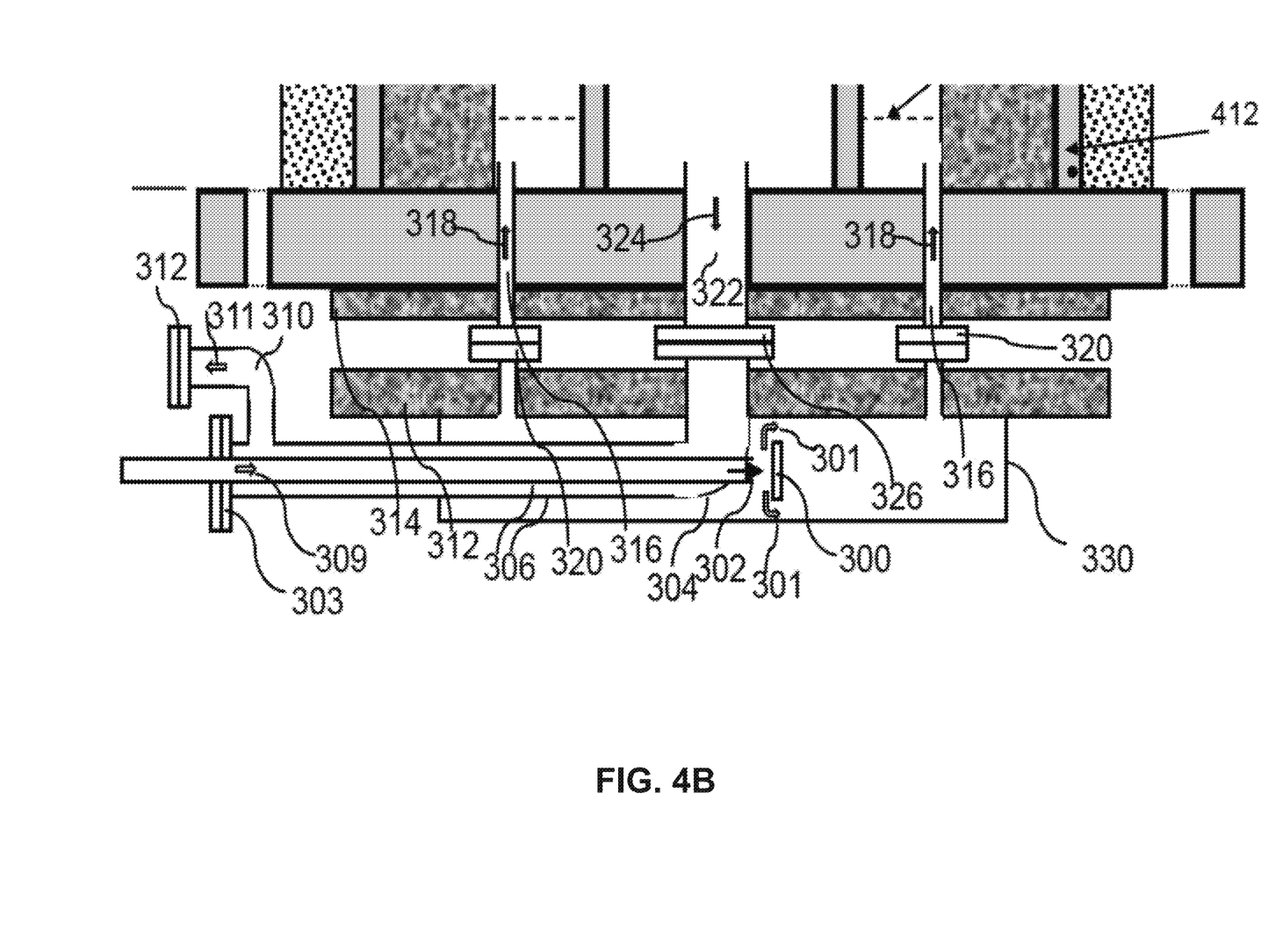
FIG. 4B is an enlargement of a portion of the bottom of the apparatus of FIG. 4A.

FIG. 4 describes a more detailed reactor bottom design for feeding gas to the reactor and extracting the syngas product. In FIG. 4 the reactant gases 309 flow in through flange 308. The flow from the inlet pipe exit 302 impacts baffle 300 where the diverted flow 301 is a mixed into small vortices so that the flow distribution in the bottom plenum box 330 more equally feeds the four annular feed ports 316 producing inlet flows 318. The product syngas leaves the reactor at flow 324 in the single larger port 322 and leaves from the bottom plenum in pipe 306 with the smaller pipe inside. This concentric arrangement serves as a countercurrent heat exchanger to recover the exit heat and use it to preheat the feed flow 309. The flange arrangement 308 permits the gases in this larger pipe to travel around elbow 310 as flow 311 to exit through flange 312.

There are insulation plates 314 inserted in the bottom plenum 330 next to the reactor bottom and plates 312 at the exit pipes above the plenum 330. There are four flange pairs 320 serving flow entering at 318 and the single flange for the exit gas 326 that are accessible with clamps for their seal so that the bottom section can be easily removed for cleaning and installation.

Figure 5A:
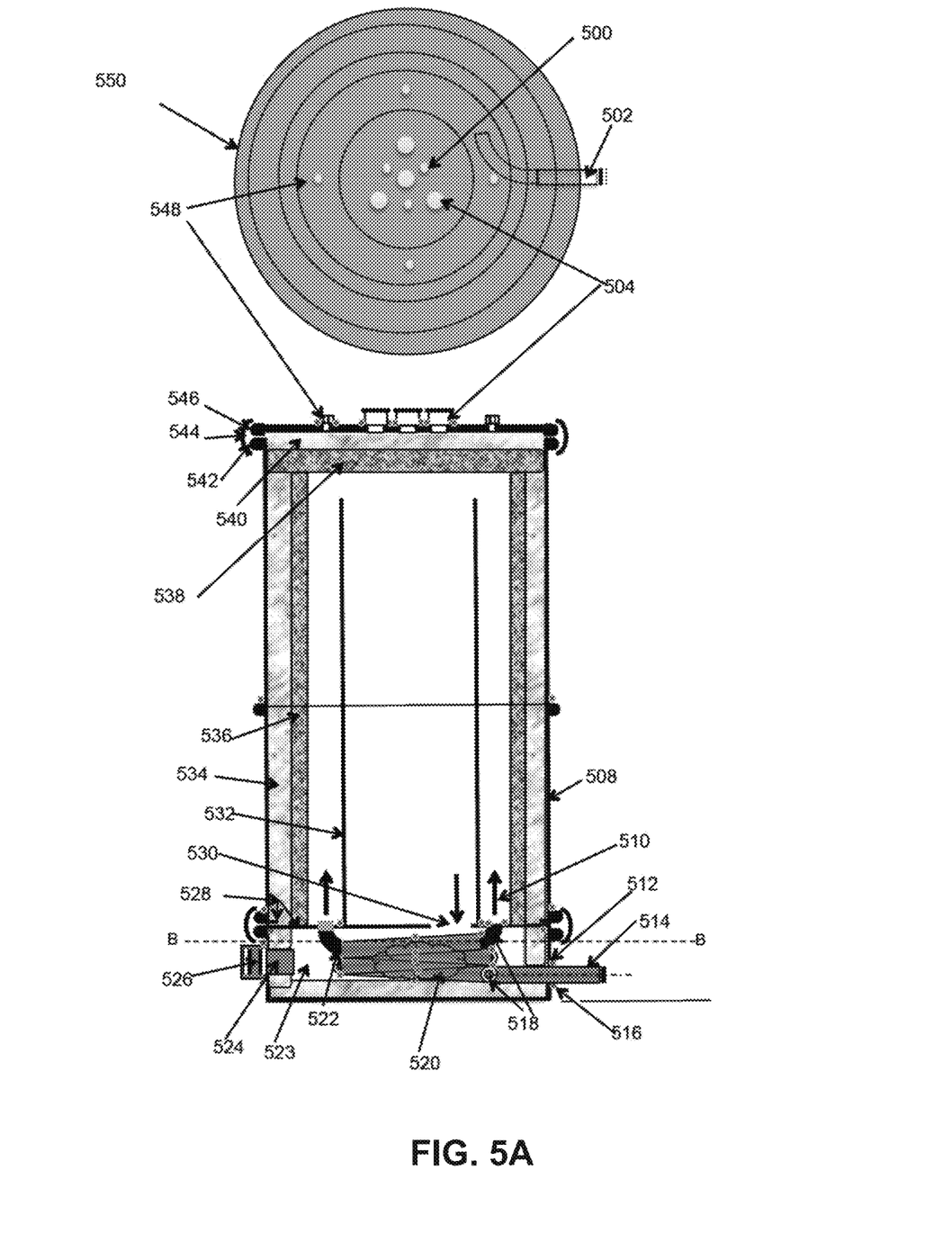
FIG. 5A shows top plan views and side cross sectional elevational views according to another embodiment of a reactor with a coil heat.
Figure 5B:
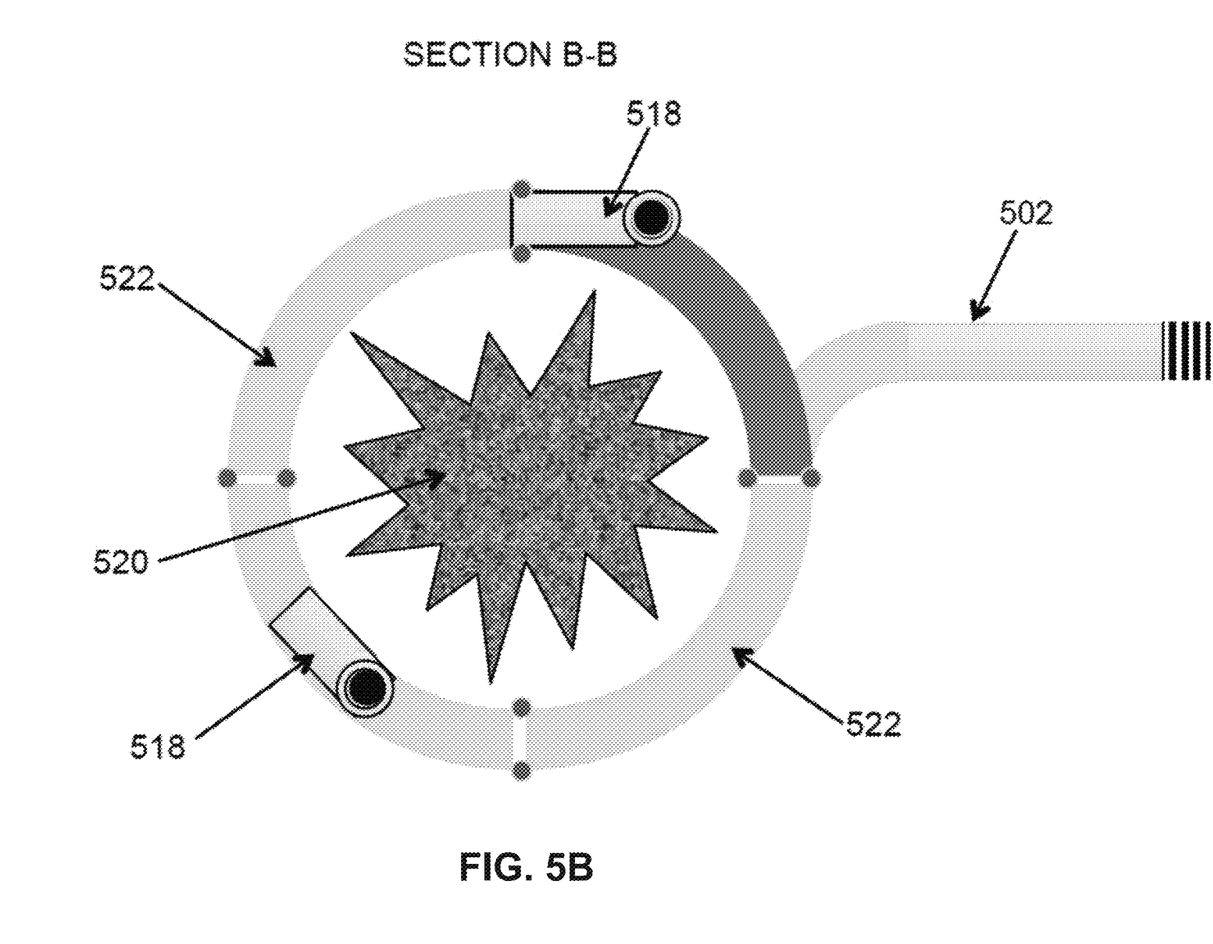
FIG. 5B shows a cross section of the apparatus of FIG. 5A looking down at line B-B, showing a coil and a thermal radiating block centrally located in this coil.

Yet another embodiment of the present invention is shown in FIGS. 5A and 5B, which show a cross section of a ⅒ scale reactor used in a pilot plant to test the concept of an entrance tube 514 with coiled tube heat exchanger 522 with a ceramic reradiating body 520 located at the tube coil center. The very hot syngas enters the coil heat exchanger through port 530 located in this heat exchanger bottom plenum 523. Long radius elbows are used at the two transition points 518 entering and leaving the coiled heat exchanger. The feed gases preheated by the coiled heat exchanger 522 (also detailed in FIG. 5B) enter the annular flow region 510 through a welded long radius elbow 518. A high alloy annular tube 532 is welded to the base of the reactor that is the top of the heat exchanger plenum 523. The exit gases leave the bottom plenum 523 through bulkhead fitting 524 and exit piping 526.

The reactor vessel 518 is insulated from the inside with a foam alumina insert 536 cast into the final shape and preferably surrounded by heat blanket 534 (such as a blanket comprises Kaowool) and a cast foam insulating lid 538 to the reactor. The reactor top 550 has a clamp on stainless lid 546 using steel rim clamps 544 and bolting 542. Through the top of this reactor lid are thermocouples 548 going down into the annular flow region as well as thermocouples 500 going down into the center portion of the reactor. The lid is shown with four immersion heating elements 504 attached to the top of the lid by a sanitary clamp-on fitting.

One embodiment of the present invention is presented in an example that involves validating the electrical heating elements performance using a computational heat transfer model that includes the turbulence promoters shown in FIG. 1 in the two flow passages of the outer annulus and in the center annular core as well as the flow paths shown in the bottom heat recuperator shown in FIG. 3.

The Table 1 below shows the computational heat transfer model results in consideration of the apparatus of FIG. 4 for each of the flow input streams 309 and 318, together with the flow outlet streams 324 and 311. The electrical heating elements 60 and 64 shown placed downward through the lid shown in FIG. 2 are in two groups: first group 64 placed in the outer annular flow region 8 and totaling 16 elements drawing a current of 96 amps, and the second group 60 of 12 elements drawing 72 amps placed in the central region of the annulus 9. The total heating capacity of these groups of elements is 144 kWe. The fixed constants for the calculations are given in the top portion of this table involving 14 rows.

For comparison the heat transfer model predicts that the heat transfer of 504.11 kWe is possible given the gas mass flow of 3500 lbs/hr shown in the row labeled "Gas Flow In". In the rows below are shown each of the steps of the calculations down to the the $2^{nd}$ row from the bottom showing the maximum heat transfer possible of 504.11.

If all the turbulence generator strakes were removed, the total maximum heat transfer achieved is predicted to be 279.75 kWe—nearly double the electrical capacity of the elements of 144 kWe.

Various aspects of different embodiments of the present invention are expressed in paragraph X1 as follows:

One aspect of the present invention pertains to a method for gasification. The method preferably includes flowing a stream of a first hydrocarbon gas from an inlet at the bottom of a first plenum toward a top outlet. The method preferably includes electrically heating the flowing first gas along the axial length of the first plenum. The method preferably includes flowing the heated gas from the top outlet to a top inlet of a second plenum and toward a bottom outlet. The method preferably includes heating the flowing gas along the axial length of the second plenum.

Yet other embodiments pertain to the previous statement X1, which is combined with one or more of the following other aspects.

The method preferably includes converting the first hydrocarbon gas to a syngas by said heating in at least one of the plenums and removing the syngas from the bottom outlet.

Wherein the first plenum is of any shape, and the second plenum is of any shape.

Where in the second plenum is located within the first plenum.

Which further comprises first flowing the stream of the first hydrocarbon gas from an entrance of a first plenum toward the bottom inlet.

Which further comprises transferring heat from the syngas proximate the bottom outlet to the first gas in the first plenum.

Wherein the first plenum includes a plurality of heat transfer fins.

Which further comprises flowing the removed syngas from the bottom outlet over a heat sink.

Wherein the heat sink is a radiative heat sink.

Wherein the heat sink is aerodynamically shaped to minimize resistance to the flow of the syngas.

Which further comprises transferring heat from the heat sink to the first hydrocarbon gas; wherein said transferring heat is by radiation and convection; wherein said transferring heat is substantially by radiation.

Wherein said electrically heating in the first plenum is by a plurality of resistive heating elements each extending along substantially the entire axial length of the first plenum.

Wherein each of the resistive heating elements is substantially linear.

Wherein each of the resistive heating elements has two ends and which further comprises supporting each element at only one end.

Wherein the first hydrocarbon gas includes steam.

Wherein the syngas includes substantial hydrogen.

Wherein the first plenum surrounds the second plenum.

Wherein at least one of the inner or outer cylindrical walls of said first plenum includes a plurality of aerodynamic strakes protruding into the annular flowpath.

Which further comprises generating turbulence by the strakes.

Which further comprises generating vortices by the strakes during said flowing the heated gas toward the top outlet.

Wherein a wall of the second plenum includes a plurality of aerodynamic strakes protruding into the flowpath.

Which further comprises generating vortices by the strakes during said flowing the heated gas toward the bottom outlet.

Which further comprises repeatedly tripping the boundary layer during said flowing a stream.

Which further comprises repeatedly tripping the boundary layer during said flowing the heated gas.

TABLE 1

| STEAM REFORMER REACTOR ZONE HEAT TRANSFER ANALYSIS | | | | | | |
|---|---|---|---|---|---|---|
| Wellhead Gas Nom = | 25 | wet tpd | Fee Temperature in = | 300 | ° F. | |
| Wellhead Gas Feedrate = | 5724 | lbs/hr | Feedrate in tone = | 68.688 | | |
| Total Process Heat Need = | 2.388 | mm BTU/hr | Total Process Heat Need = | 699.7 | kW | |
| Total Process Heat Need Outside = | 2.388 | mm BTU/hr | 50% Process Heat Need = | 699.68 | kW | |
| Number of 7 tpd size reactors = | 9.81 | | | 5.14 | kW/element | |
| Number of elements = | 28 | | | 144.05 | kW | |
| total element surface area = | 8996.16 | in2 | Tot. Element No-Fin Area | 5.80 | m2 | |
| Total Element with Fin Area = | 16.34 | m2 | Syngas Temperature out = | 900 | ° F. | |
| Tube Thickness = | 0.625 | in | Tube Thickness = | 0.0159 | m | |
| Recycle Gas Composition, $CO_2$ = | 50 | % | Recycle Gas Comp., $H2O$ = | 50 | % | |
| Annulus Flow Gap = | 6.000 | in | Reactor Inner Diameter = | 30 | in | |
| Annulus Diameter = | 18.000 | in | | | | |
| HX tube diameter | 4.000 | in | Hx Tube Length = | 80 | in | |
| Thermal Cond of Inconel tube wall | 18.0 | W/m-K | Feed Water Evap + Superht | 117.2 | kW | |

| | Gas in to HX Strm 309 | to Annulus Strm 318 | Center in | Center out Strm 324 | Hx out Strm 311 | Total | units |
|---|---|---|---|---|---|---|---|
| Gas Flow in = | 3500 | 3500 | 3500 | 3500 | | | lbs./hr |
| Gas Temp in = | 722 | 1350 | 1600 | 1850 | 1332 | | ° F. |
| Gas Temp out = | 722 | 1350 | 1275 | 1850 | 1332 | | ° F. |
| Surface Temp in = | 100 | 400 | 700 | | | | ° F. |
| Surface Temp out = | 400 | 700 | 900 | | | | ° F. |
| Gas Temp in = | 657 | 732 | 871 | 1010 | 722 | | ° C. |
| Gas Temp out = | 383 | 732 | 691 | 1010 | 722 | | ° C. |
| Surface Temp in = | 38 | 204 | 371 | | | | ° C. |
| Surface Temp out = | 204 | 371 | 482 | | | | ° C. |
| Gas Ave Temp | 793 | 1005 | 1054 | 1283 | 995 | | ° K. |
| Gas Sensible Heat | 437 | 0 | 289 | 727 | | | kW |
| Gas Density = | 0.152 | 0.118 | 0.104 | 0.082 | 0.110 | | kg/m3 |
| Kinematic Viscosity = | 0.000400 | 0.000576 | 0.000675 | 0.000886 | 0.000576 | | m2/sec |
| Thermal Conduct = | 0.2690 | 0.3100 | 0.3280 | 0.363 | 0.3100 | | W/m-k |
| Flow Cross Section Area = | 0.0730 | 0.2842 | 0.1584 | 0.2842 | 0.2919 | | m2 |
| Gas Velocity = | 39.8467 | 13.1791 | 26.8259 | 18.9651 | 39.8467 | | m/s |
| Reynolds No. = | 75,908 | 17,435 | 30,283 | 16,311 | 52,714 | | |
| Sq Root Reynolds No. = | 276 | 132 | 174 | 128 | 230 | | |
| Prandtl No. = | 0.717 | 0.736 | 0.750 | 0.775 | 0.736 | | |
| Cube Root Prandt No = | 0.895 | 0.903 | 0.909 | 0.919 | 0.903 | | |
| Strake Fract Turbulence | 0.000 | 0.130 | 0.130 | 0.130 | 0.000 | | |
| Frossling No. = | 0.800 | 1.500 | 1.500 | 1.500 | 0.800 | | |
| Nusselt No. = | 197.3 | 178.8 | 237.2 | 176.0 | 165.9 | | |
| No Fin heat transfer Area = | 0.649 | 3.317 | 2.487 | 3.317 | 0.649 | | m2 |
| No Fin Heat Trans Coef = | 69.650 | 72.757 | 102.096 | 83.834 | 67.473 | | W/m2-K |
| No Fin Heat Flux = | 27.02 | 120.80 | 119.59 | 267.41 | 30.70 | 504.11 | kW |

Which further comprises thermally insulating the outer diameter of the first plenum.

Wherein the outer wall of said first plenum includes a ceramic insulator.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for high temperature gasification, comprising:
flowing a stream of a first hydrocarbon gas from an entrance of a bottom annular plenum region toward an inlet at a bottom of an annular plenum, the bottom annular plenum region being discrete from the annular plenum;
flowing the stream of the first hydrocarbon gas from the bottom inlet toward a top outlet;
electrically heating the flowing first gas along the axial length of the annular plenum;
flowing the heated gas from the top outlet to a top inlet of a cylindrical plenum and toward a bottom outlet;
electrically heating the flowing gas along the axial length of the cylindrical plenum;
converting the first hydrocarbon gas to a syngas by said heating in at least one of the annular or cylindrical plenums;
removing the syngas from the bottom outlet; and
transferring heat from the syngas proximate the bottom outlet to the first gas in the bottom annular plenum region;
wherein the annular plenum surrounds the cylindrical plenum.

2. The method of claim 1 wherein the bottom annular plenum region includes a plurality of heat transfer fins.

3. The method of claim 1 which further comprises flowing the removed syngas from the bottom outlet over a heat sink.

4. The method of claim 3 wherein the heat sink is a radiative heat sink.

5. The method of claim 3 wherein the heat sink is aerodynamically shaped to minimize resistance to the flow of the syngas.

6. The method of claim 3 which further comprises transferring heat from the heat sink to the first hydrocarbon gas.

7. The method of claim 6 wherein said transferring heat is by radiation and convection.

8. The method of claim 6 wherein said transferring heat is substantially by radiation.

9. The method of claim 1 wherein said electrically heating in the annular plenum is by a plurality of resistive heating elements each extending along substantially the entire axial length of the annular plenum.

10. The method of claim 9 wherein each of the resistive heating elements is linear, having a rod-like shape and two opposing ends; and which further comprises supporting each element at only one end.

11. The method of claim 1 wherein the first hydrocarbon gas includes steam.

12. The method of claim 1 wherein the syngas includes substantial hydrogen.

13. The method of claim 1 which further comprises thermally insulating the outer diameter of the annular plenum.

14. The method of claim 13 wherein the outer cylindrical wall of said annular plenum includes a ceramic insulator.

15. The method of claim 1 wherein at least one of the inner or outer cylindrical walls of said annular plenum includes a plurality of aerodynamic strakes protruding into the annular flowpath.

16. The method of claim 15 which further comprises generating turbulence by the strakes.

17. The method of claim 15 which further comprises generating vortices by the strakes during said flowing the heated gas toward the top outlet.

18. The method of claim 1 wherein a wall of the cylindrical plenum includes a plurality of aerodynamic strakes protruding into the flowpath.

19. The method of claim 18 which further comprises generating vortices by the strakes during said flowing the heated gas toward the bottom outlet.

20. The method of claim 1 which further comprises repeatedly tripping the boundary layer during said flowing a stream.

21. The method of claim 1 which further comprises repeatedly tripping the boundary layer during said flowing the heated gas.

22. A method for high temperature gasification, comprising:
flowing a stream of a first hydrocarbon gas from an entrance of a bottom annular plenum region toward an inlet at the bottom of an annular plenum, the bottom annular plenum region including a plurality of heat transfer fins;
flowing the stream of the first hydrocarbon gas from the bottom inlet toward a top outlet;
electrically heating the flowing first gas along the axial length of the annular plenum;
flowing the heated gas from the top outlet to a top inlet of a cylindrical plenum and toward a bottom outlet;
electrically heating the flowing gas along the axial length of the cylindrical plenum;
converting the first hydrocarbon gas to a syngas by said heating in at least one of the annular or cylindrical plenums; and
removing the syngas from the bottom outlet;
wherein the annular plenum surrounds the cylindrical plenum.

23. The method of claim 22 which further comprises transferring heat from the syngas proximate the bottom outlet to the first gas in the bottom annular plenum region.

24. The method of claim 22 which further comprises flowing the removed syngas from the bottom outlet over a heat sink.

25. The method of claim 24 wherein the heat sink is a radiative heat sink.

26. The method of claim 24 wherein the heat sink is aerodynamically shaped to minimize resistance to the flow of the syngas.

27. The method of claim 24 which further comprises transferring heat from the heat sink to the first hydrocarbon gas.

28. The method of claim 27 wherein said transferring heat is by radiation and convection.

29. The method of claim 27 wherein said transferring heat is substantially by radiation.

30. The method of claim 22 wherein said electrically heating in the annular plenum is by a plurality of resistive heating elements each extending along substantially the entire axial length of the annular plenum.

31. The method of claim 30 wherein each of the resistive heating elements is linear, having a rod-like shape and two opposing ends; and which further comprises supporting each element at only one end.

32. The method of claim 22 wherein the first hydrocarbon gas includes steam.

33. The method of claim 22 wherein the syngas includes substantial hydrogen.

34. The method of claim 22 which further comprises thermally insulating the outer diameter of the annular plenum.

35. The method of claim 34 wherein the outer cylindrical wall of said annular plenum includes a ceramic insulator.

36. The method of claim 22 wherein at least one of the inner or outer cylindrical walls of said annular plenum includes a plurality of aerodynamic strakes protruding into the annular flowpath.

37. The method of claim 36 which further comprises generating turbulence by the strakes.

38. The method of claim 36 which further comprises generating vortices by the strakes during said flowing the heated gas toward the top outlet.

39. The method of claim 22 wherein a wall of the cylindrical plenum includes a plurality of aerodynamic strakes protruding into the flowpath.

40. The method of claim 39 which further comprises generating vortices by the strakes during said flowing the heated gas toward the bottom outlet.

41. The method of claim 22 which further comprises repeatedly tripping the boundary layer during said flowing a stream.

42. The method of claim 22 which further comprises repeatedly tripping the boundary layer during said flowing the heated gas.

* * * * *